United States Patent
Beels van Heemstede et al.

(10) Patent No.: US 7,694,780 B2
(45) Date of Patent: Apr. 13, 2010

(54) PUMP FOR TRANSFER CASE

(75) Inventors: Hans R. Beels van Heemstede, Heidelberg (DE); Christopher E. Blair, Waterford, MI (US); Charles E. Johnson, Jr., Muncie, IN (US); Wayne E. Wyant, Alexandria, IN (US); Bryan C. Wright, Southgate, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 1047 days.

(21) Appl. No.: 11/098,320

(22) Filed: Apr. 4, 2005

(65) Prior Publication Data

US 2005/0232788 A1    Oct. 20, 2005

Related U.S. Application Data

(60) Provisional application No. 60/560,095, filed on Apr. 7, 2004.

(51) Int. Cl.
 F16H 57/04 (2006.01)
 F01M 1/00 (2006.01)
 F16N 13/20 (2006.01)

(52) U.S. Cl. .................. 184/6.12; 184/6.13; 184/26; 184/31; 415/72; 416/176

(58) Field of Classification Search .......... 184/26, 184/27.1, 31, 27.3, 37, 43, 6.11, 6.12, 6.13, 184/6.28; 415/71, 72, 90, 206; 417/364, 417/410.4; 418/145–147, 266–268; 416/176
See application file for complete search history.

(56) References Cited

U.S. PATENT DOCUMENTS

| | | | |
|---|---|---|---|
| 2,362,667 A * | 11/1944 | Schmidt | 384/305 |
| 3,223,196 A | 12/1965 | Stott | |
| 4,193,746 A * | 3/1980 | Aman, Jr. | 418/32 |
| 4,241,959 A | 12/1980 | Frister | |
| 4,491,374 A | 1/1985 | Hagshenas et al. | |
| 4,789,316 A | 12/1988 | Gable | |
| 4,942,944 A | 7/1990 | Frey et al. | |
| 5,318,153 A * | 6/1994 | Saito et al. | 184/31 |
| 5,341,901 A | 8/1994 | Mueller et al. | |
| 5,474,152 A * | 12/1995 | Wilkinson et al. | 184/6.12 |
| 5,707,220 A * | 1/1998 | Krueger et al. | 417/423.12 |
| 5,713,670 A | 2/1998 | Goldowsky | |
| 5,779,005 A | 7/1998 | Jones, Jr. et al. | |
| 5,828,149 A | 10/1998 | Parmeter et al. | |
| 5,941,532 A * | 8/1999 | Flaherty et al. | 277/400 |
| 6,659,720 B2 | 12/2003 | Rockwood | |

(Continued)

Primary Examiner—Bradley T King
Assistant Examiner—Thomas Irvin
(74) Attorney, Agent, or Firm—Warn Partners, P.C.

(57) ABSTRACT

The present invention is directed to a pump arrangement for use in a gear box housing. The interior surface of the gear box housing has a collection wall arranged in the interior surface of the housing. A shaft is rotatably disposed through the gear box housing and has a longitudinal bore extending through the shaft that provides a lubrication delivery arrangement for distributing lubricant through the gear box housing. A pump housing circumscribes the shaft and has a discharge cavity connected to the longitudinal bore. Additionally, the pump housing has an inlet port for receiving lubrication from the collection wall. Contained within the pump housing is a pump member that has an impeller face and helical threaded surface that pressurizes and introduces the lubricant into the lubricant delivery arrangement.

26 Claims, 6 Drawing Sheets

U.S. PATENT DOCUMENTS 6,672,830 B2   1/2004  Rockwood
6,843,348 B2 * 1/2005  Wittkopp .................... 184/7.4
7,014,419 B2 * 3/2006  Farnsworth et al. ......... 415/113

* cited by examiner

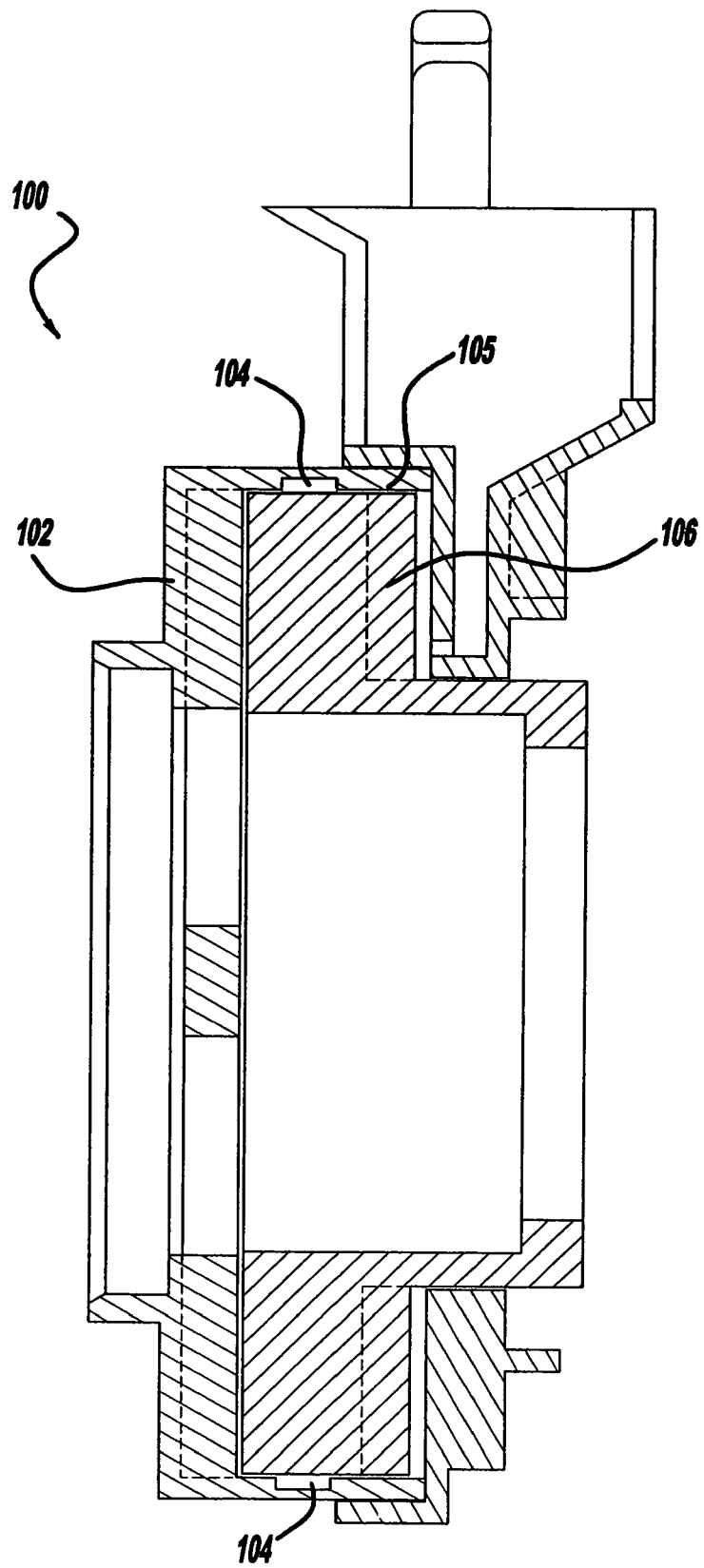

PUMP FOR TRANSFER CASE

CROSS-REFERENCE TO RELATED APPLICATIONS

This application claims the benefit of U.S. Provisional Application No. 60/560,095, filed Apr. 7, 2004. The disclosure of the above application is incorporated herein by reference.

FIELD OF THE INVENTION

The present invention relates to a gear box pump for collecting and pressurizing lubricating fluid for delivery to specific locations within the gear box housing.

BACKGROUND OF THE INVENTION

Gear boxes such as transfer cases will often require a system for the delivery of lubrication to various components within the gear box housing. For example, in a transfer case the bearings that rotatably support the various shafts within the transfer case housing need a steady supply of lubrication in order to prevent heat damage. Additionally, other components such as chains, gear sets and other torque transfer elements also need a steady source of lubrication. Typically the system for delivery of lubricant involves using a lubrication pump to pressurize and force the lubricant through a delivery arrangement to specific locations within the gear box housing. In vehicle transfer cases oftentimes the input shaft will have a longitudinally extending bore with various radial outputs for delivering lubricant from the longitudinal bore to a specific location within the transfer case housing. A pump is used to pressurize the lubricant and deliver it through the longitudinal bore that extends through the shaft. The pump is typically a gerotor type pump that is classified as a fixed displacement pump. A disadvantage of using a gerotor pump is that there can be a relatively high power loss associated with this type of pump. In some applications this high power loss is unacceptable. The objective of the present invention is to provide a lubrication pump that will deliver lubricating oil with a reduced power loss as compared to conventional style pumps.

SUMMARY OF THE INVENTION

The present invention is directed to a pump arrangement for use in a gear box housing. A shaft is rotatably disposed through the gear box housing. The shaft has a longitudinal bore extending through the shaft which provides a lubrication delivery arrangement that distributes lubricant through the gear box housing. The interior surface of the gear box housing has a collection wall or lubrication furrow. A pump housing circumscribes the shaft and has a discharge cavity connected to the longitudinal bore. Additionally, the pump housing has an inlet port for receiving lubrication from the collection wall. Contained within the pump housing is a rotational pump member that circumscribes, is connected to and rotates with the shaft. The exterior surface of the pump member has an impeller face that is adjacent a helically extending pumping surface. The impeller face is arranged to receive lubrication from the inlet port and move the lubricant to the helically disposed pumping surface. As the pump member rotates with the shaft, lubrication moves along the helical grooves or threads on the exterior surface of the pump member. The lubricant gains pressure as it moves along the exterior surface and when the lubricant reaches the discharge cavity it is pressurized. In an alternate embodiment the helically extending pumping surface is disposed on an interior surface of the pump housing as opposed to being formed on the surface of the rotational pump member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a cross-sectional side plan view of a pump arrangement incorporating an alternate embodiment of the invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
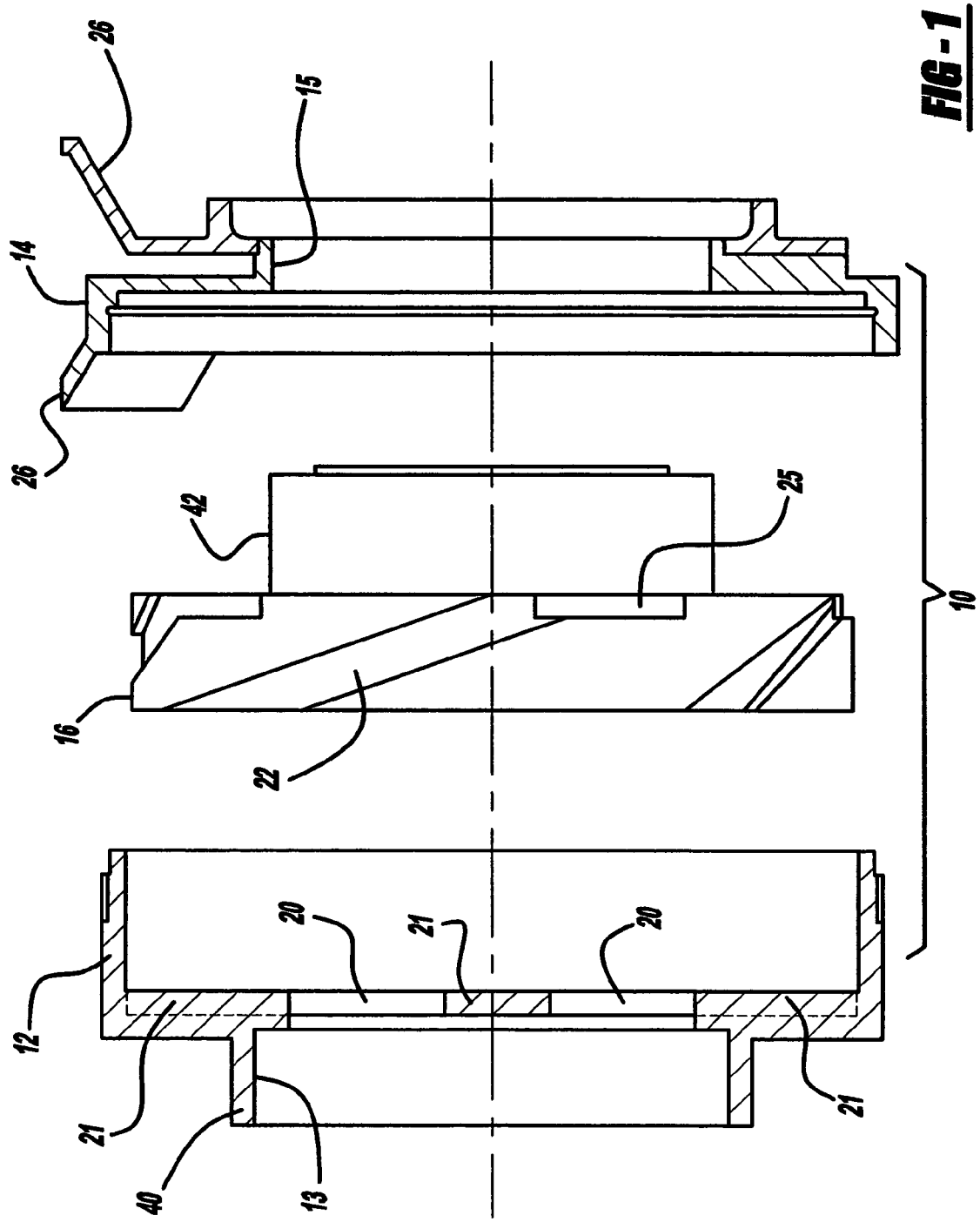
FIG. 1 is an exploded side partial cross-section of FIG. 2.
Figure 2:
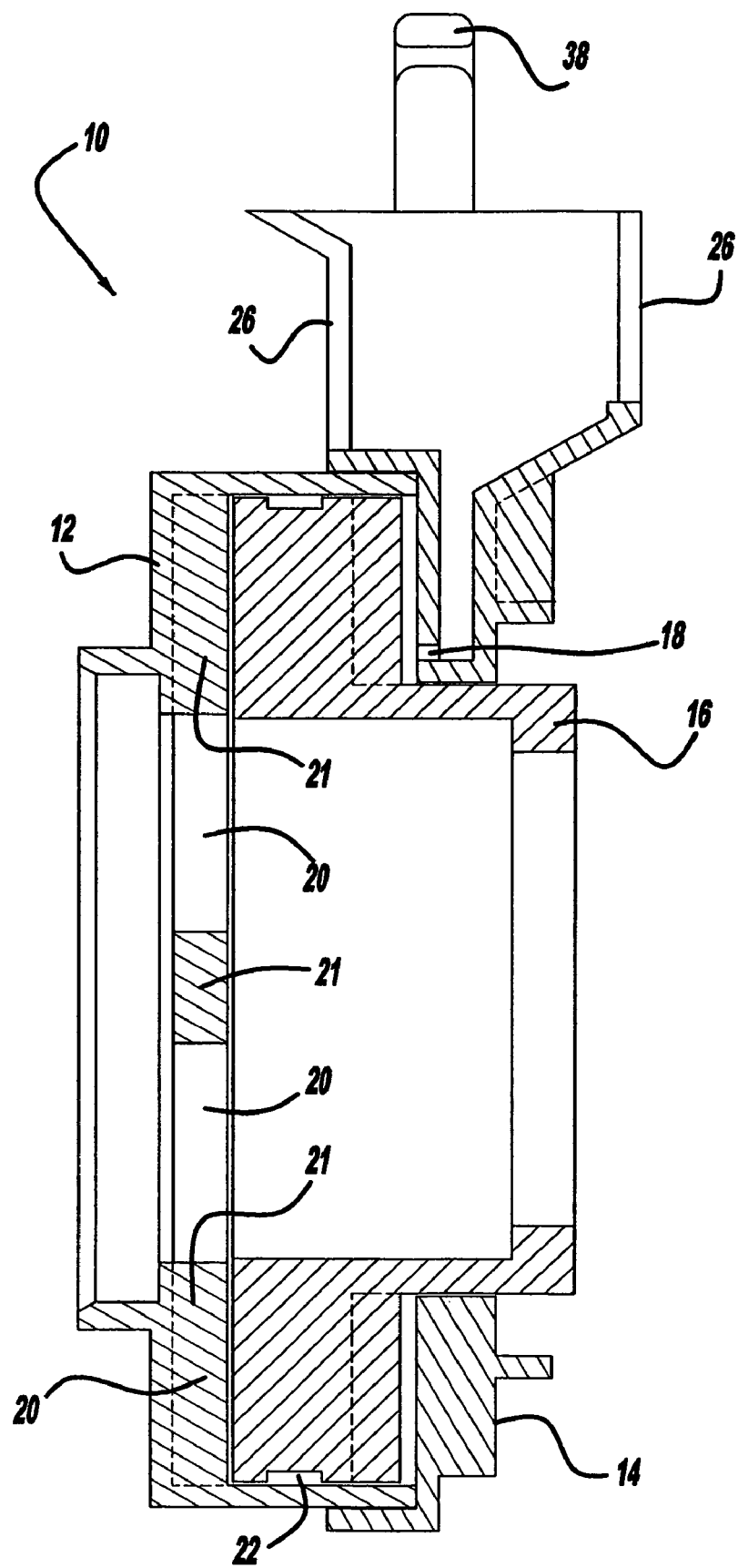
FIG. 2 is a cross-sectional side view taken along section line 2-2.
Figure 3:
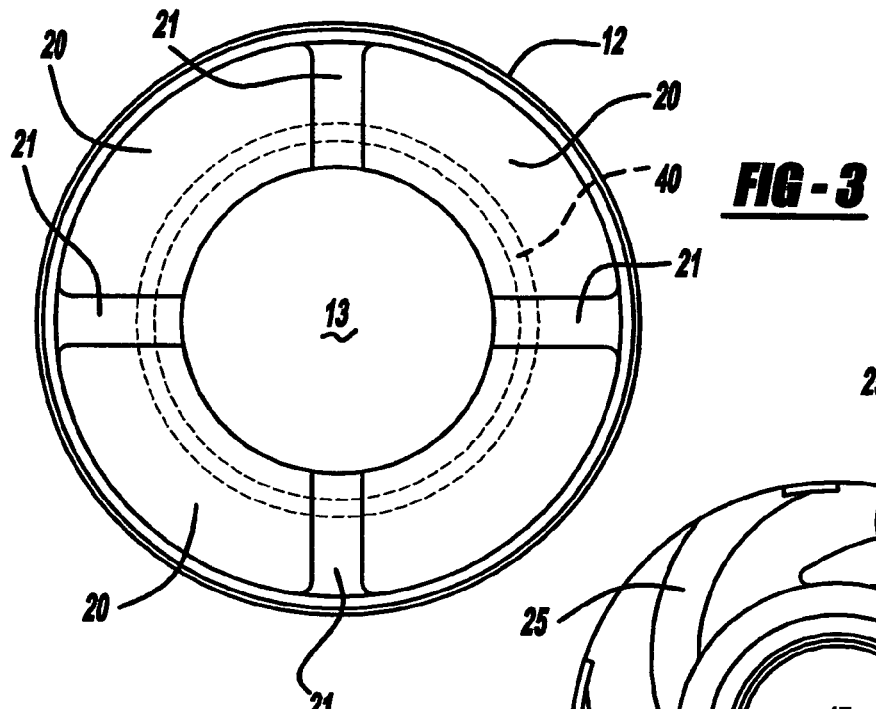
FIG. 3 is an end view of the pump housing where all of the other components will be assembled.
Figure 4:
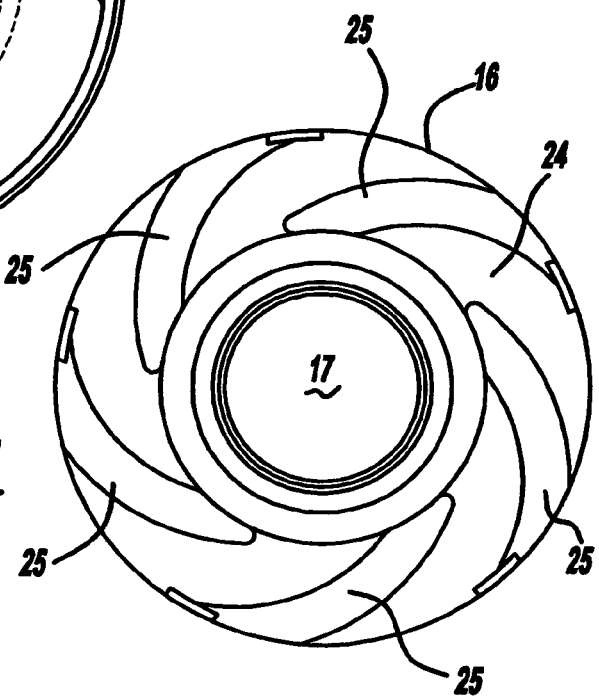
FIG. 4 is an end view of the pump member.
Figure 5:
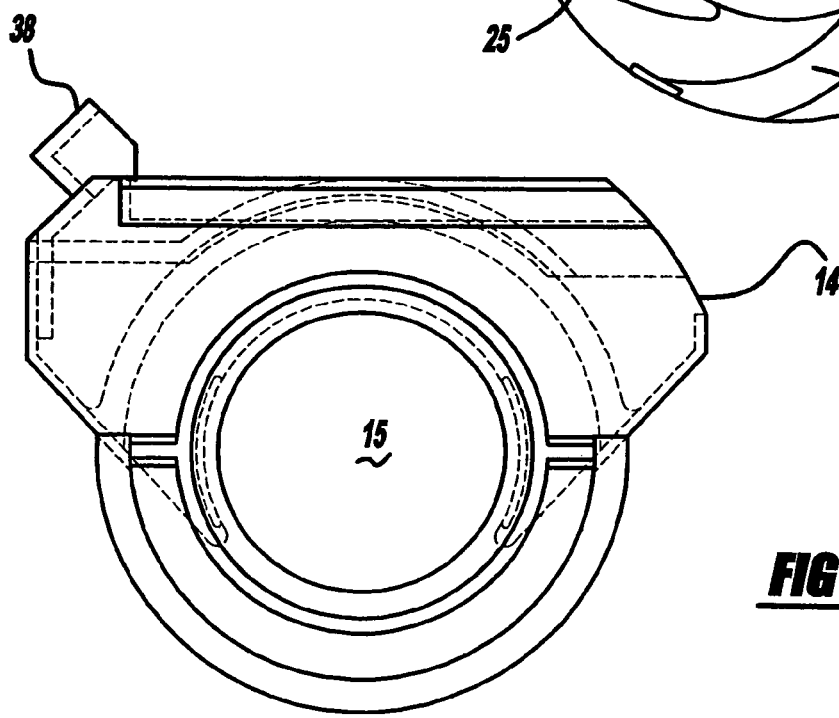
FIG. 5 is an end view of the collector.

FIGS. 1-2 show side views of a pump arrangement 10 as it looks without being assembled in a gear box. As shown, the pump arrangement 10 has three main components consisting of a pump housing 12, a collector 14 and a rotational or pump member 16. FIGS. 3-5 show plan end views of the pump housing 12 (shown in FIG. 3), the pump member 16 (shown in FIG. 4) and the collector 14 (shown in FIG. 5).

Figure 6:
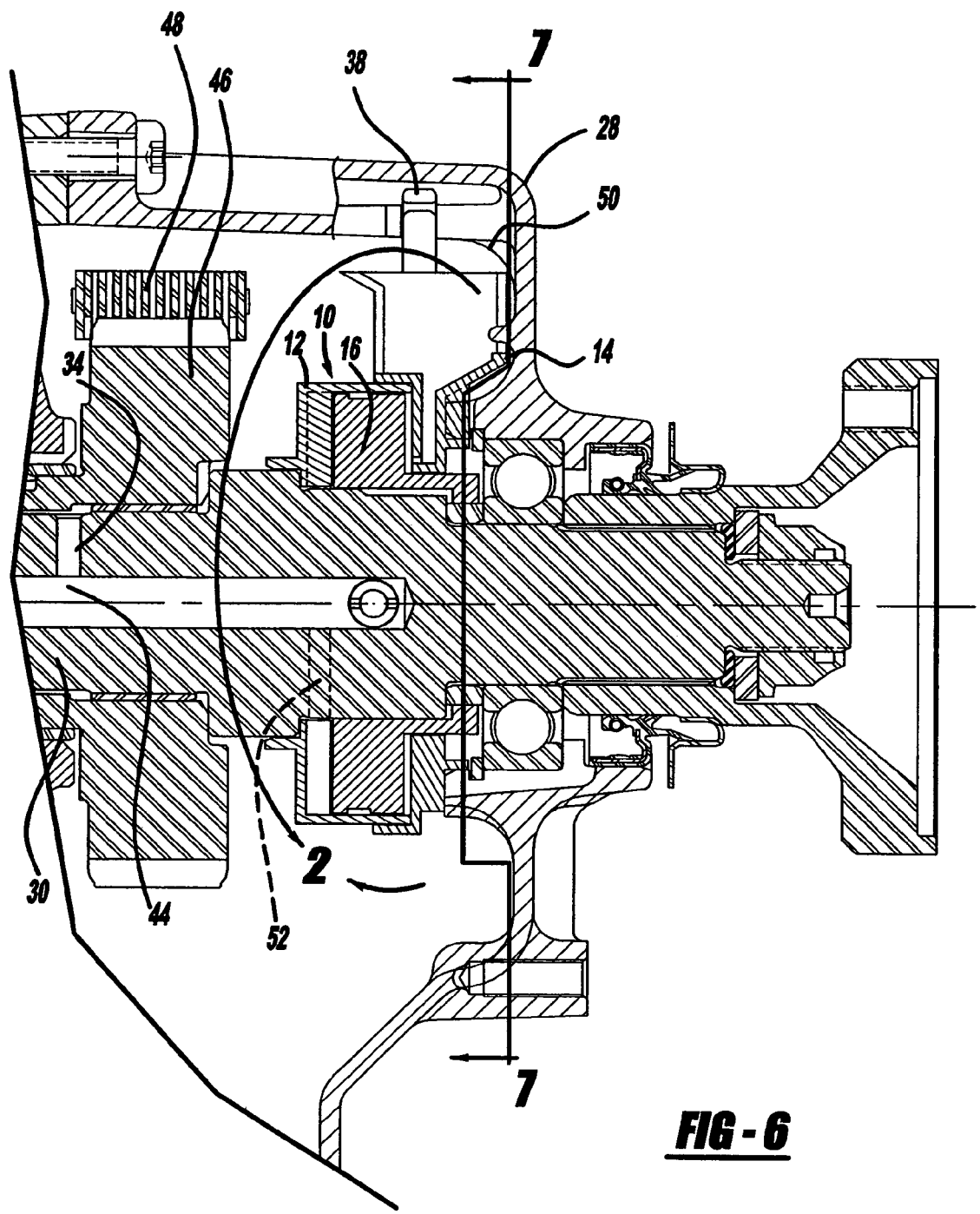
FIG. 6 is a cross-sectional plan side view of the pump connected to a shaft inside of a transfer case housing.
Figure 7:
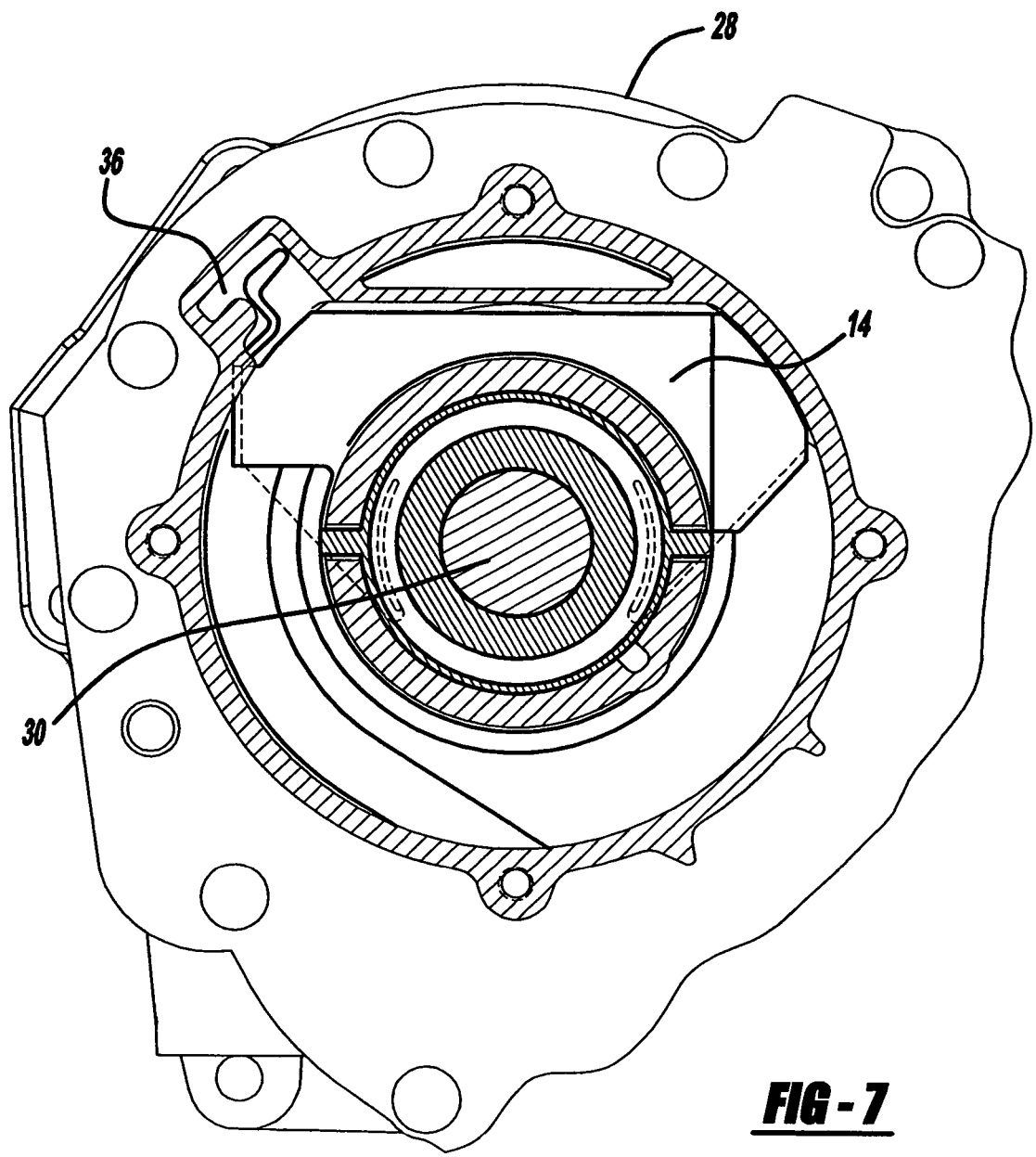
FIG. 7 is a cross sectional view of the pump positioned in the transfer case housing.

The collector 14 has an aperture 15 which is used to fix the collector 14 in a circumscribing relationship about a shaft 30 (see FIGS. 6-7). The aperture 15 is a smaller diameter than the rest of the collector 14 which allows for the collector 14 to be in close fit with the shaft 30. The collector 14 has a funnel 26 which is used to collect lubricant. The funnel 26 has a top portion that has a wide diameter with tapered walls that extend downward, thus allowing the funnel 26 to more effectively catch lubricant and gather it at a smaller diameter neck of the funnel 26. An inlet port 18 is connected at a perpendicular angle at the bottom of the smaller diameter neck of the funnel 26. The inlet port 18 allows the lubricant to be delivered through the wall of the collector 14 for introduction to the pump member 16 which is contained by the pump housing 12.

The pump housing 12 has an aperture 13 that is used to mount the pump housing 12 to the shaft 30 in a circumscribing fashion. The pump housing 12 also has a collar 40 which has a diameter that is smaller than the pump housing 12. The collar 40 allows the pump housing 12 to encase a rotating pump member 16. The pump housing 12 has four discharge cavities 20 which are separated by four ribs 21. At the discharge cavities 20 pressurized lubricant is collected prior to leaving the pump housing 12. While this particular embodiment describes four discharge cavities 20 and four ribs 21, a greater or lesser number of discharge cavities 20 or ribs 21 can be used depending on the needs of the particular application. For example, a smaller pump housing 12 may require a lesser number of discharge cavities 20 and ribs 21 than a housing that is larger in size.

The pump member 16 has an aperture 17 that is used to mount the pump member 16 to the shaft 30 in a circumscribing fashion so that the pump member 16 will rotate with the shaft 30. The pump member 16 also has a collared portion 42 that is smaller in diameter than the rest of the pump member 16, thus allowing the pump member 16 to have a greater area of support on the shaft 30 and be capable of sliding into the aperture 15 of the collector 14. This improves stability as the pump member 16 rotates with the shaft 30. The pump member 16 is rotatably contained within the housing 12 and is positioned between the inlet port 18 and the discharge cavities 20. The pump member 16 has an impeller face 24 which receives lubricant from the inlet port 18. As lubricant contacts the impeller face 24, centrifugal force caused by the rotation of the pump member 16 causes the lubricant to move to the outer circumference of the impeller face 24. When lubricant reaches the outer perimeter of the impeller face 24 it is delivered to a radially outer surface of the pump member 16. The radially outer surface includes at least one and preferably a plurality of helically extending surfaces or helical grooves 22, forming a very coarse series of truncated insert threads. The threads are either recessed into the surface or they can be extended away from the surface. The rotation of the pump member 16 causes the lubricant to move along the helical grooves 22. The lubricant moves in a longitudinal direction along the axis of the pump member 16 toward the discharge cavities 20 of the pump housing 12. Note that the four ribs 21 on the pump housing 12 form a gap between the wall of the pump housing 12 and the pump member 16. The rotation of the pump member 16 causes the movement of fluid along the grooves 22 located on the surface which causes the lubricant to become pressurized.

The impeller face 24 on the pump member 16 initially accelerates the movement of lubricant from the inlet port 18 to the helical grooves 22 of the pump member 16. This is helpful from the standpoint that the lubricant at the inlet port 18 is not pressurized and therefore the use of the impeller face 24 acts as a centrifugal pump to quickly accelerate the lubricant to the surface 22. However, the use of an impeller face 24 is not completely necessary for the operation of the pump arrangement 10. It is possible for the lubricant to be moved using a pump member 16 that just has the surface with one or more helical insert threads 22 and does not have an impeller face 24. Likewise it is also within the scope of this invention to have a pump member 16 that only has the impeller face 24 without one or more helical threads.

While this particular embodiment of the invention describes the collector 14 and the pump housing 12 as being two separate connectable structures, it is possible to have the structures be more integrated with each other. For example, the wall of the pump housing 12 can be integrated with the collector 14 so that the pump member 16 is rotatably disposed within the boundaries of the collector 14, rather than the boundaries of the pump housing 12 as described above. The pump housing 12 can be modified to serve as a plug member allowing the pump member 16 to be inserted within the collector 14. FIG. 6 is a cross-sectional view of the pump arrangement 10 in operation within a gear box housing 28. The gear box housing 28 as used herein is not to be limited to housings that only have moveable gear members, rather the term "gear box" as used herein encompasses all mechanical assemblies used for the transmission of power in an automotive power train. In the present embodiment the gear box 28 is a transfer case housing incorporating the pump arrangement 10. The pump arrangement 10 can also be used in combination with other types of systems such as differentials, transmissions, generators or virtually any system where lubricant needs to be pumped throughout the system.

The pump arrangement 10 is positioned on a shaft 30, which in this case is a rear output shaft of a vehicle driveline. However, the pump arrangement 10 can be incorporated on virtually any type of shaft where lubrication is needed, such as transfer case input or output shafts. The pump arrangement can also be used on shafts for power generators, vehicle differentials, motorcycle shaft drives and vehicle transmissions.

The shaft 30 extends through the apertures 13, 15, 17 of the various components of the pump arrangement 10. The pump member 16 is connected to and rotates with the shaft 30, while the pump housing 12 and collector 14 are connected together and fastened to the gear box housing 28 in a stationary manner using a mounting flange 38. The mounting flange 38 is a portion of the collector 14 that protrudes from the top of the funnel portion 26 to allow the collector 14 to be fastened in a stationary manner to the gear box housing 28.

A longitudinal bore 44 extends through the shaft 30. The longitudinal bore 44 is used to move lubricant to various locations throughout the gear box housing 28. Along the length of the longitudinal bore 44 there is a radial bore 34 that extends perpendicular from the longitudinal bore 44 to the surface of the shaft 30. The radial bore 34 is used to deliver lubricant to selected portions throughout the gear box housing 28. While FIG. 6 only shows one radial bore 34, there can be more than one radial bore 34 present along the length of the shaft 30.

In operation, the pump arrangement 10 operates in the following manner. The gear box housing 28 contains moving components that have lubricant on their surfaces. As shown in FIG. 6, the shaft 30 has lubricant on its surface that reduces friction during the rotation of the shaft 30. A sprocket 46 and chain 48 rotate about the shaft 30. Both the sprocket 46 and chain 48 are covered in lubricant, because as the chain 48 rotates, the slack from the chain 48 is passed through a lubrication sump (not shown) at the bottom of the gear box housing 28. The high speed of rotation of the shaft 30, sprocket 46 and chain 48 causes lubricant to fly off of these components and onto the inside surface of the gear box housing 28. Gravity then causes the lubricant to drip down the inside surface of the gear box housing 28. As gravity pulls the lubricant downward it gets collected in a lubrication furrow 36 (shown in FIG. 7) that is formed on the inside surface of the gear box housing 28. The lubrication furrow 36 directs the lubricant toward a collection wall 50 that empties into the funnel 26 of the collector 14. The lubricant is then collected at the base of the funnel 26 and is introduced into the pump arrangement 10 through the inlet port 18.

The rotating shaft 30 and pump member 16 draw in the lubricant through the inlet 18 using the impeller face 24. The impeller face 24 has grooves 25 which move the lubricant using centrifugal force. When the lubricant reaches the outer diameter of the impeller face 24, the lubricant moves longitudinally along the surface 22 of the pump member 16. The lubricant becomes pressurized as it moves from the inlet 18 to the end of the surface 22 of the pump member 16.

The pressurized lubricant moves off the screw pump 16 and is collected in the discharge cavities 20. The discharge cavities 20 allow the pressurized lubricant to be collected where it then enters the longitudinal bore 44 of the shaft 30 using a bore input port 52. At this point the lubricant is delivered and recirculated in the same manner described above.

As the shaft 30 rotates, a certain amount of back pressure can be produced from the bore input port 52 which is caused by centrifugal force occurring within the bore input port 52. The discharge cavities 20 allow lubricant to collect and build pressure to overcome any back pressure formed in the bore input port 52.

Referring to FIG. 7 a cross-sectional view taken about sections lines 7-7 on FIG. 6 can be seen. The pump arrangement 10 is shown to be mounted on the shaft 30 all of which are located inside of the transfer case housing 28. The transfer case housing has a lubrication furrow 36 which extends in a generally parallel fashion to the shaft 30. As described in detail above, the lubrication furrow 36 functions to collect lubricant that is propelled from the various components inside of the transfer case housing 28.

FIG. 8 is a cross-sectional overhead view of a pump arrangement 100 incorporating an alternate embodiment of the invention. This particular embodiment of the invention has a pump housing 102 having at least one helically extending pumping surface 104 located on an interior surface 105 of the pump housing 102. A pump rotational member 106 has a smooth surface that is positioned adjacent the interior surface 105 of the pump housing 102. As the rotational pump member 106 rotates with the shaft 30 fluid will be pressurized and moved through the pump housing 102 along the surface 104.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pump arrangement for a gear box comprising:
   a gear box housing;
   a shaft rotatably disposed in said gear box housing;
   a pump including a stationary pump housing and a rotational member, said pump housing having an interior surface circumscribing said shaft and said rotational member and having an inlet port and a discharged path;
   a fluid delivery arrangement in said shaft which is connected to said discharge path;
   one of said stationary pump housing or rotational member including a helical extending surface on a radially facing surface such that the rotation of said shaft and rotational member causes fluid to be moved axially along said helical surface to said inlet port of said fluid delivery arrangement in said shaft; and
   an impeller surface on said rotational member that is separate from and operably engages said helical extending surface, wherein fluid from said inlet port becomes pressurized by said impeller surface and said helical extending surface as said fluid moves radially across said impeller face and axially along said helical extending surface and into said fluid delivery arrangement.

2. The pump arrangement of claim 1 wherein said helically extending surface is formed on an interior surface of said pump housing.

3. The pump arrangement of claim 1 wherein said helically extending surface is at least one groove in said rotational member.

4. The pump arrangement of claim 3 wherein a plurality of grooves are formed in said rotational member.

5. The pump arrangement of claim 1 wherein said fluid delivery arrangement distributes fluid throughout said gear box housing.

6. The pump arrangement of claim 1 wherein said fluid delivery arrangement is a longitudinal bore extending through said shaft and having one or more bores extending from said longitudinal bore.

7. The pump arrangement of claim 1 wherein said gear box housing is part of a vehicle transfer case, power generator, vehicle differential, motorcycle drive shaft or vehicle transmission.

8. The pump arrangement of claim 1 wherein said gear box housing has a lubrication furrow for collecting fluid and directing said fluid to said pump housing.

9. A pump arrangement for a gear box comprising:
   a gear box housing;
   a shaft rotatably disposed in said gear box housing;
   a pump housing circumscribing said shaft and having an inlet port and a discharge path;
   a lubrication delivery arrangement in said shaft connected to said discharge path; and
   a pump member having at least one helically disposed and radially facing pumping surface and an axially facing impeller surface that is separate from and operably engages said at least one helically disposed pumping surface, said pump member being located inside said pump housing wherein said pump member is circumscribing and connected to said shaft for rotation with said shaft and pumping fluid, and wherein said fluid is pressurized by said impeller surface and said helically disposed surface as said fluid moves from said inlet port radially across said impeller face and axially along said at least one helically disposed pumping surface and into said lubrication delivery arrangement in said shaft.

10. The pump arrangement of claim 9 wherein said impeller surface is placed under said inlet port.

11. The pump arrangement of claim 9 wherein said at least one helically disposed pumping surface is defined as being a groove in said pump member.

12. The pump member arrangement of claim 9 wherein a plurality of grooves are formed in said pump member.

13. The pump arrangement of claim 9 wherein said impeller surface has at least one arced groove.

14. The pump arrangement of claim 9 wherein said pump member is placed between said inlet port and said discharge cavity.

15. The pump arrangement of claim 9 wherein said gear box housing is part of a vehicle transfer case, a power generator, a vehicle differential, a motorcycle drive shaft, or a vehicle transmission.

16. The pump arrangement of claim 9 wherein said gear box housing has a lubrication furrow for collecting fluid and directing it to said pump housing.

17. The pump arrangement of claim 9 wherein said fluid delivery arrangement distributes fluid throughout said gear box housing.

18. The pump arrangement of claim 9 wherein said fluid delivery arrangement is a longitudinal bore extending through said shaft having one or more bores extending from said longitudinal bore.

19. A pump arrangement for a gear box comprising:
   a gear box housing;
   a shaft rotatably disposed in said gear box housing, wherein said shaft has a longitudinal bore extending through said shaft;
   a pump housing circumscribing said shaft wherein said pump housing has a discharge cavity connected to said longitudinal bore and an inlet port disposed through said pump housing for receiving lubrication from said gearbox housing; and a pump member circumscribing and connected to said shaft, for rotation with said shaft, wherein said pump member is positioned within said pump housing, said pump member having a radial outer surface including a helically extending pumping surface thereon, said pumping member arranged to receive lubrication fluid from said inlet port and pumping said fluid to said longitudinal bore of said discharge cavity, and an impeller surface on said rotational member that is separate from and operably engages said helically extending pumping surface, wherein fluid from said inlet port becomes pressurized by said impeller surface and said helically extending surface as said fluid moves radially across said impeller face and axially along said helically extending pumping surface and into said longitudinal bore.

20. The pump arrangement of claim 19 wherein said helically extending pumping surface is a groove in said pump member.

21. The pump arrangement of claim 19 wherein a plurality of grooves are formed in said pump member.

22. The gear box of claim 19 wherein said impeller surface has one or more arcuate grooves on said surface of said impeller portion, wherein said arcuate grooves are configured to move fluid medium to said helical threaded surface.

23. The gear box of claim 19 wherein said impeller portion is positioned under said inlet port of said pump housing.

24. The gear box of claim 19 wherein said pump member is positioned between said inlet port of said pump housing and a discharge cavity, and said pump member is configured to move a lubricant from said inlet port to said discharge cavity.

25. The gear box of claim 19 further comprising a collection wall formed on the interior surface of said gear box housing, wherein said collection wall is configured to collect fluid medium to be introduced to said pump housing through said inlet port.

26. The pump arrangement of claim 19 wherein said gear box housing is part of a vehicle transfer case, a power generator, a vehicle differential, a motorcycle drive shaft, or a vehicle transmission.

* * * * *